US012604308B2

(12) United States Patent
Liang et al.

(10) Patent No.: US 12,604,308 B2
(45) Date of Patent: Apr. 14, 2026

(54) SEARCH SPACE CONFIGURATION METHOD AND APPARATUS, AND DEVICE AND STORAGE MEDIUM

(71) Applicant: GUANGDONG OPPO MOBILE TELECOMMUNICATIONS CORP., LTD., Dongguan (CN)

(72) Inventors: Bin Liang, Dongguan (CN); Jing Xu, Dongguan (CN); Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 351 days.

(21) Appl. No.: 18/222,647

(22) Filed: Jul. 17, 2023

(65) Prior Publication Data

US 2023/0362916 A1 Nov. 9, 2023

Related U.S. Application Data

(63) Continuation of application No. PCT/CN2021/084150, filed on Mar. 30, 2021.

(51) Int. Cl.
*H04W 72/23* (2023.01)
*H04W 72/1263* (2023.01)
*H04W 72/232* (2023.01)

(52) U.S. Cl.
CPC ..... *H04W 72/1263* (2013.01); *H04W 72/232* (2023.01)

(58) Field of Classification Search
CPC ........... H04W 72/232; H04W 72/1263; H04W 72/23; H04L 5/00; H04L 5/0094; H04L 5/0053
See application file for complete search history.

(56) References Cited

U.S. PATENT DOCUMENTS

2015/0092632 A1 4/2015 Park
2020/0229100 A1* 7/2020 He ........................ H04W 80/02
(Continued)

FOREIGN PATENT DOCUMENTS

CN 110662228 A 1/2020
CN 111132344 A 5/2020
CN 111901869 A 11/2020
EP 4084551 A1 11/2022

OTHER PUBLICATIONS

Extended European Search Report issued in corresponding European application No. 21933689.8, mailed Jan. 30, 2024.
(Continued)

*Primary Examiner* — Andrew Lee
(74) *Attorney, Agent, or Firm* — BAYES PLLC

(57) ABSTRACT

The present application relates to the field of mobile communications. Disclosed are a search space configuration method and apparatus, and a device and a storage medium. The method comprises: receiving configuration signaling sent by a network device, wherein the configuration signaling is used to configure at least one first search space for a first cell to schedule a second cell across carriers, wherein the second cell is a self-scheduling cell; and detecting downlink control information in the at least one first search space. When the second cell supports self-scheduling, the second cell can also be scheduled by the first cell. Therefore, the manners of configuring a search space group of a cell are increased, and the cell scheduling manners are also increased, thereby improving the communication effect.

16 Claims, 5 Drawing Sheets

(56)     References Cited

U.S. PATENT DOCUMENTS

| | | | |
|---|---|---|---|
| 2021/0045147 A1* | 2/2021 | Zhou | H04W 72/23 |
| 2021/0168775 A1* | 6/2021 | Hang | H04L 5/0094 |
| 2021/0204276 A1* | 7/2021 | Ge | H04L 1/0026 |
| 2021/0385826 A1* | 12/2021 | Moon | H04W 72/23 |
| 2022/0053540 A1* | 2/2022 | Takeda | H04W 72/23 |
| 2022/0303880 A1* | 9/2022 | Takeda | H04W 48/16 |
| 2022/0304017 A1* | 9/2022 | Khoshnevisan | H04L 5/0092 |
| 2023/0199752 A1* | 6/2023 | Shi | H04L 5/001 |
| 2023/0361961 A1* | 11/2023 | Li | H04W 72/232 |
| 2023/0397191 A1* | 12/2023 | Bagheri | H04W 72/52 |

OTHER PUBLICATIONS

Nokia et al., "PDCCH monitoring enhancements", R1-2100258, 3GPP TSG RAN WG1 #104-e e-Meeting, Jan. 25-Feb. 5, 2021.
Qualcomm Incorporated, "PDCCH monitoring enhancements", R1-2101454, 3GPP TSG-RAN WG1 #104-e e-Meeting, Jan. 25-Feb. 5, 2021.
Oppo, "Discussion on cross-carrier scheduling from Scell to Pcell", R1-2100186, 3GPP TSG RAN WG1 #104-e e-Meeting, Jan. 25-Feb. 5, 2021.
International Search Report issued in International application No. PCT/CN2021/084150, mailed Dec. 8, 2021.
Written Opinion of the International Searching Authority issued in International application No. PCT/CN2021/084150, mailed Dec. 8, 2021.

* cited by examiner

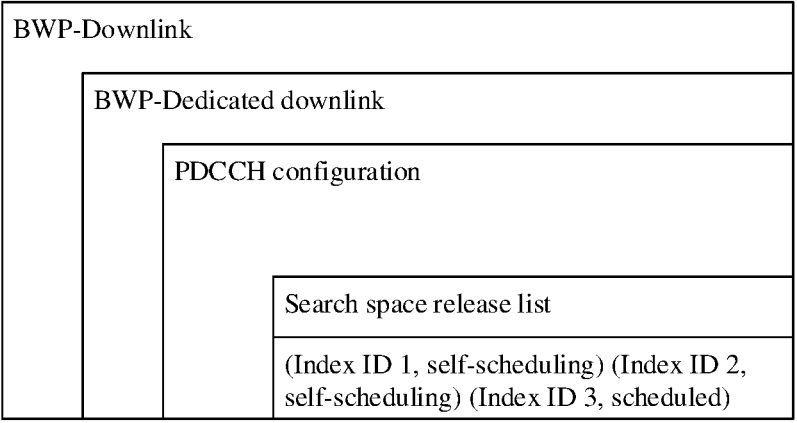
FIG. 13
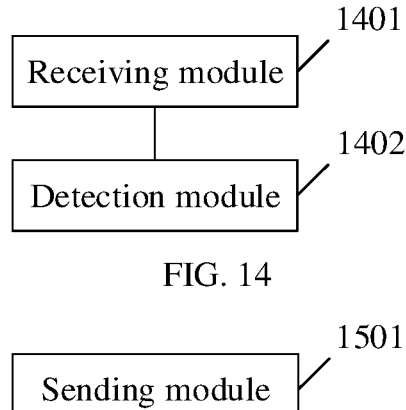
FIG. 14
FIG. 15
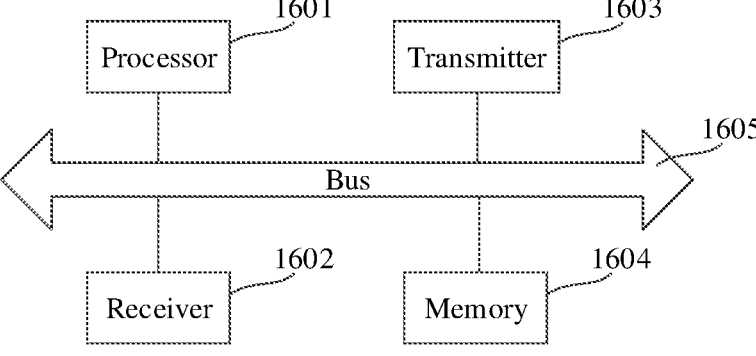
FIG. 16

1

SEARCH SPACE CONFIGURATION METHOD AND APPARATUS, AND DEVICE AND STORAGE MEDIUM

CROSS-REFERENCE TO RELATED APPLICATION

This application is a continuation of International Application No. PCT/CN2021/084150, filed Mar. 30, 2021, the entire contents of which are incorporated herein by reference.

TECHNICAL FIELD

The present application relates to the field of mobile communications, and in particular, to a method, apparatus for configuring a search space, a device and a storage medium.

BACKGROUND

In a New Radio (NR) system, a network device configures a search space for a terminal device, and the terminal device performs Physical Downlink Control Channel (PDCCH) detection in the configured search space.

In a multi-carrier scenario, the terminal device is located in a first cell and a second cell. Taking the first cell as a Primary cell (Pcell) and the second cell as a Secondary cell (Scell) as an example, if the search space of Pcell configured for the terminal device is used for scheduling Pcell, the terminal device detects the downlink control information in the Pcell, and the detected downlink control information schedules the Pcell itself, but the Pcell cannot be scheduled by other cell(s). Therefore, a method for configuring a search space of a cell is urgently needed, so that the self-scheduled cell can also be scheduled by other cell(s).

SUMMARY

The embodiments of the present application provide a method, apparatus for configuring a search space, a device, and a storage medium, which not only expand the way of configuring the search space of a cell, but also expand the way that the cell is scheduled, thereby improving the communication effect. The technical solutions are as follows.

According to an aspect of the present application, there is provided a method for configuring a search space, applied to a terminal device, the method includes:

receiving a configuration signaling sent by a network device, where the configuration signaling is used for configuring at least one first search space for cross-carrier scheduling a second cell by a first cell, and the second cell is a self-scheduling cell; and detecting downlink control information in the at least one first search space.

According to an aspect of the present application, there is provided a method for configuring a search space, applied to a network device, and the method includes:

sending a configuration signaling to a terminal device, where the configuration signaling is used for configuring at least one first search space for cross-carrier scheduling a second cell by a first cell, where the second cell is a self-scheduling cell;

where the terminal device is configured to detect downlink control information in the at least one first search space.

According to an aspect of the present application, there is provided an apparatus for configuring a search space, which is arranged in a terminal device, and the apparatus includes:

a receiving module, configured to receive a configuration signaling sent by a network device, where the configuration signaling is used for configuring at least one first search space for cross-carrier scheduling a second cell by a first cell, where the second cell is a self-scheduling cell;

a detection module, configured to detect downlink control information in the at least one first search space.

According to an aspect of the present application, there is provided an apparatus for configuring a search space, which is arranged in a network device, and the apparatus includes:

a sending module, configured to send a configuration signaling to a terminal device, where the configuration signaling is used for configuring at least one first search space for cross-carrier scheduling a second cell by a first cell, where the second cell is a self-scheduling cell;

where the terminal device is configured to detect downlink control information in the at least one first search space.

According to an aspect of the present application, there is provided a terminal device, including: a processor; a transceiver connected to the processor; a memory for storing executable instructions of the processor; where the processor is configured to load and execute the executable instructions to implement the method for configuring a search space as described in the above aspects.

According to an aspect of the present application, there is provided a network device, including: a processor; a transceiver connected to the processor; a memory for storing executable instructions of the processor; where the processor is configured to load and execute the executable instructions to implement the method for configuring a search space as described in the above aspects.

According to an aspect of the present application, there is provided a computer-readable storage medium, an executable program code is stored in the readable storage medium, and the executable program code is loaded and executed by a processor to implement the method for configuring a search space as described in the above aspects.

According to an aspect of the present application, there is provided a chip, the chip includes a programmable logic circuit and/or program instructions, and when the chip runs on a terminal device or a network device, the method for configuring a search space as described in the above aspects is implemented.

According to an aspect of the present application, an embodiment of the present application provides a computer program product, when the computer program product is executed by a processor of a terminal device or a network device, the method for configuring a search space as described in the above aspects is implemented.

The technical solutions provided by the embodiments of the present application include at least the following beneficial effects.

In the method, apparatus, device, and storage medium provided by the embodiments of the present application, the terminal device determines at least one first search space configured by the network device for cross-carrier scheduling the second cell by the first cell, and the second cell supports self-scheduling, in the case that the second cell supports self-scheduling, it can also be scheduled by the first cell, which not only expands the way of configuring the search space of the cell, but also expands the way that the cell is scheduled, thereby improving the communication effect.

BRIEF DESCRIPTION OF THE DRAWINGS

In order to illustrate the technical solutions in the embodiments of the present application more clearly, the following briefly introduces the drawings that are used in the description of the embodiments. Obviously, the drawings in the following description are only some embodiments of the present application. For those of ordinary skill in the art, other drawings can also be obtained from these drawings without creative effort.

FIG. 13 shows a structural diagram of configuration signaling provided by an exemplary embodiment of the present application.

FIG. 14 shows a block diagram of a communication apparatus provided by an exemplary embodiment of the present application.

FIG. 15 shows a block diagram of a communication apparatus provided by an exemplary embodiment of the present application.

FIG. 16 shows a schematic structural diagram of a communication device provided by an exemplary embodiment of the present application.

DETAILED DESCRIPTION

In order to make the objectives, technical solutions and advantages of the present application clearer, the embodiments of the present application will be further described in detail below with reference to the accompanying drawings.

First, the terms involved in the present application are explained:

Search Space:

The search space includes a Common search space (CSS) and a UE-specific search space (USS). The USS is used to transmit control information related to DL Synchronization Channel (DL-SCH) and UL-SCH. CSS is used to transmit control information related to Broadcast Control Channel (BCCH), paging, and ReAuthRequest (RAR).

The terminal can be configured with a plurality of Control resource sets (CORESETs), and the plurality of CORESETs are located in the Band Width Part (BWP). And each BWP can be configured with up to 4 CORESETs. For Physical Downlink Control Channel (PDCCH), the time-frequency position of PDCCH is located in CORESET. The frequency domain of one CORESET consists of Resource Blocks (RBs) of a first reference number, and the time domain consists of symbols of a second reference number.

The first reference number and the second reference number are set by the network device, or set by the terminal, or set in other manners, which are not limited in the embodiments of the present application. For example, the first reference number is 2, 3, 4 or other numerical values. The second reference number is 1, 2, 3 or other numerical values.

PDCCH Scheduling:

In a multi-carrier scenario, the terminal currently performs PDCCH detection in the search space of the Primary cell (Pcell), and the detected PDCCH can schedule the resource of the Pcell or the resource of the Secondary cell (Scell). However, the PDCCH of the Scell cannot schedule the resource of the Pcell.

If the Scell is configured as a scheduling Cell, the search space configured in the configuration information of the Scell can schedule the resource of the Scell, or schedule the resources of other Scells.

In addition, the search space of the Pcell is independently configured, the search space of the Scell is independently configured, or the search space carried on the non-own carrier is configured by configuring the associated search space index. The independent configuration is to configure the index identifier, period, and search range of the search space.

Hereinafter, the application scenarios of the present application are described.

Figure 1:
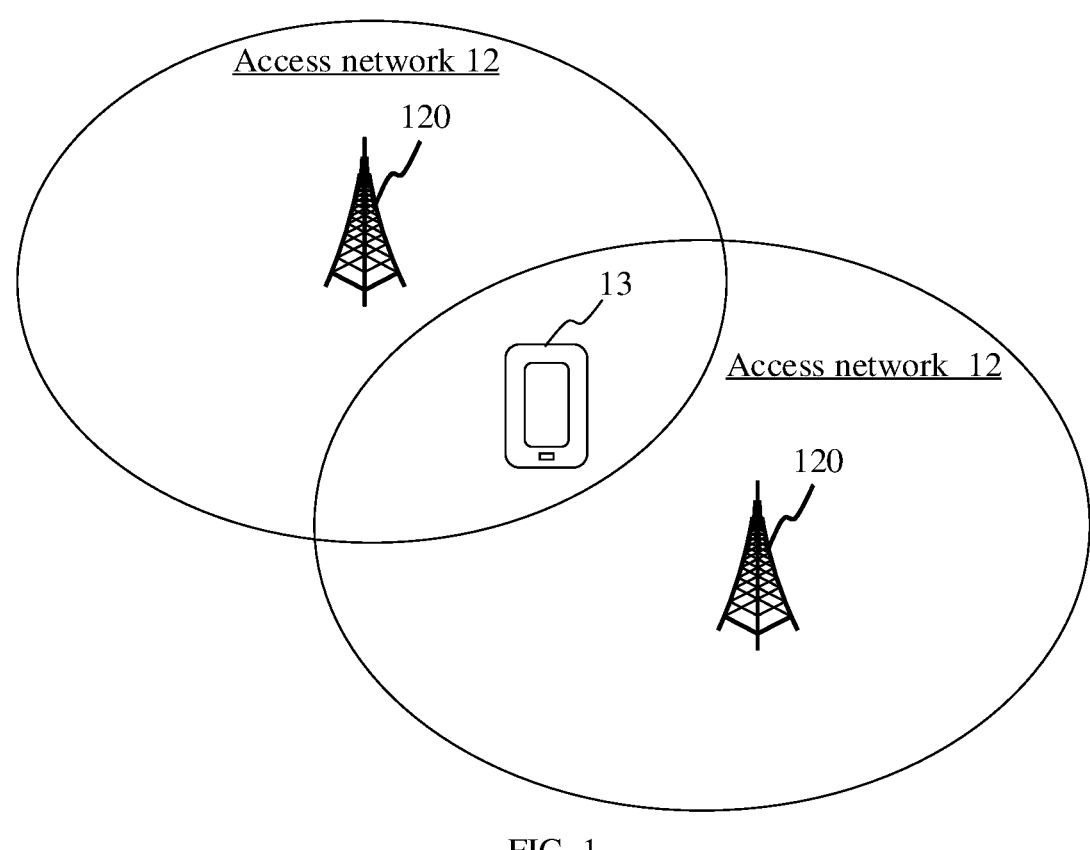
FIG. 1 shows a block diagram of a communication system provided by an exemplary embodiment of the present application.

FIG. 1 shows a block diagram of a communication system provided by an exemplary embodiment of the present application. The communication system may include: an access network 12 and a terminal device 13.

The access network 12 includes several network devices 120. The network device 120 may be a base station, which is an apparatus deployed in an access network to provide a wireless communication function for the terminal device. The base station may include various forms of macro base station, micro base station, relay station, access point and so on. In systems using different radio access technologies, the names of devices with base station functions may be different. For example, in the LTE system, they are called eNodeBs or eNBs; in the 5G NR-U system, they are called gNodeBs or gNBs. As communication technology evolves, the description of "base station" may change. For the convenience of the embodiments of the present application, the above-mentioned apparatuses for providing wireless communication functions for the terminal device 13 are collectively referred to as access network devices.

The terminal device 13 may include various handheld devices with wireless communication functions, vehicle-mounted devices, wearable devices, computing devices or other processing devices connected to wireless modems, as well as various forms of user device, mobile stations (MS), terminal devices, etc. For the convenience of description, the devices mentioned above are collectively referred to as terminal devices. The access network device 120 and the terminal device 13 communicate with each other through a certain air interface technology, such as a Uu interface.

The technical solutions of the embodiments of the present application can be applied to various communication systems, for example: a Global System of Mobile communication (GSM) system, a Code Division Multiple Access (CDMA) system, a wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced long term evolution (LTE-A) system, a New Radio (NR) system, an evolution system of NR system, an LTE-based access to unlicensed spectrum (LTE-U) system, an NR-U system, a Universal Mobile Telecommunication System (UMTS), a Worldwide Interoperability for Microwave Access (WiMAX) communication system, Wireless Local Area Networks (WLAN), Wireless Fidelity (WiFi), a next-generation communication system or other communication systems, etc.

Generally speaking, the traditional communication systems support a limited number of connections, which are easy to be implemented. However, with the development of communication technology, the mobile communication systems will not only support traditional communication, but also support, for example, Device to Device (D2D) communication, Machine to Machine (M2M) communication, Machine Type Communication (MTC), Vehicle to Vehicle (V2V) communication and Vehicle to Everything (V2X) system, etc. The embodiments of the present application can also be applied to these communication systems.

Figure 2:
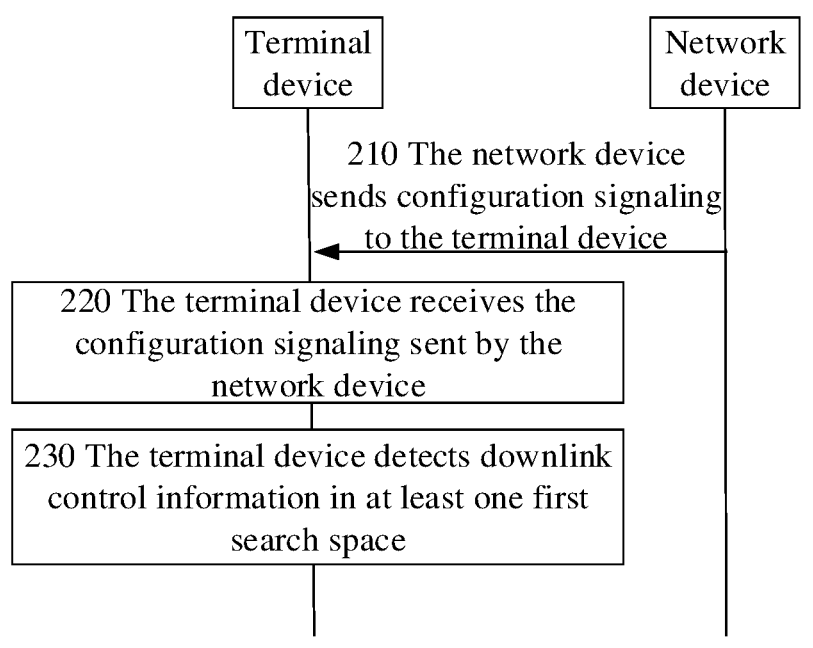
FIG. 2 shows a flowchart of a method for configuring a search space provided by an exemplary embodiment of the present application.

FIG. 2 shows a flowchart of a method for configuring a search space provided by an exemplary embodiment of the present application, which is applied to the terminal device and the network device shown in FIG. 1, and the method includes at least part of the following contents.

In 210, the network device sends a configuration signaling to the terminal device.

In 220, the terminal device receives the configuration signaling sent by the network device.

In the embodiment of the present application, the network device configures a first search space for the terminal device through the configuration signaling sent to the terminal device, and the terminal device detects downlink control information in the search space configured by the network device.

The first search space is used for cross-carrier scheduling a second cell by a first cell. The second cell is a self-scheduling cell. The self-scheduling cell refers to a cell that can schedule itself. In the self-scheduling cell, the Physical Downlink Shared Channel (PDSCH) and the PDCCH related to the PDSCH are carried in the self-scheduling cell, or it can be understood that the PDCCH that schedules the PDSCH in the self-scheduling cell and the scheduled PDSCH are in the self-scheduling cell. For example, the second cell can be scheduled by the second cell. In addition, a carrier where the first search space is located in the embodiment of the present application is the first cell.

In some embodiments, the at least one first search space belongs to a first search space group.

In some embodiments, the configuration information is further used for configuring at least one second search space, and the at least one second search space is used for the second cell to schedule the second cell, that is, the at least one second search space is used for the second cell to self-schedule the second cell. The carrier where at least one second search space is located is the second cell.

In the embodiments of the present application, the search space configured by the network device for the terminal device may belong to one search space group, or belong to two search space groups. That is, the network device may configure one search space group for the terminal device, and the search space group includes a search space for cross-carrier scheduling of the self-scheduling cell and a search space for self-scheduling the self-scheduling cell. The above-mentioned two cases are explained below.

The first case: the network device configures two search space groups for the terminal device.

In some embodiments, the at least one first search space belongs to a first search space group. The at least one second search space belongs to a second search space group.

The first search space in the first search space group is indicated by an index identifier. The second search space in the second search space group is indicated by an index identifier.

In some embodiments, the configuration signaling includes a first index list including the index identifier(s) for indicating the first search space(s) in the first search space group.

In the case that the configuration signaling includes the first index list, the terminal device parses the configuration signaling to obtain the first search space(s) in the first search space group indicated by the first index list.

For example, if the first index list includes first index identifiers 3, 4, 5, and 6, respectively, the terminal device can determine the first search spaces corresponding to the index identifiers 3, 4, 5, and 6.

It should be noted that, the embodiment of the present application only takes the configuration signaling including the first index list as an example for description. In another embodiment, the configuration signaling further includes a period and a search range, where the period is used for indicating that the search is performed once every reference duration. For example, the period is 4 symbols, 5 symbols, or other numerical values. The search range is used for indicating the search duration corresponding to each search. For example, the search range is 2 symbols, 3 symbols, or other numerical values.

In some embodiments, the configuration signaling includes a second index list including index identifier(s) for indicating second search space(s) in the second search space group.

In the case that the configuration signaling includes the second index list, the terminal device parses the configuration signaling to obtain the second search space(s) in the second search space group indicated by the second index list.

For example, if the second index list includes the first index identifiers 1 and 2, respectively, the terminal device can determine the second search spaces corresponding to the index identifiers 1 and 2.

It should be noted that the network device may configure the first search space group and the second search space group for the terminal device. In this case, the index identifiers in the first search space group and the second search space group include any of the following situations:

(1) the index identifiers of any two search spaces in the first search space group and the second search space group are different;

(2) the index identifiers of at least two search spaces in the first search space group and the second search space group are the same.

In this embodiment of the present application, the first search space and the second search space belong to different search space groups, and the first search space group and the second search space group are different search space groups. Regardless of whether the index identifiers in the first and second search space groups are the same, there will be no conflict between the search spaces indicated by the first and second index lists.

In some embodiments, the network device configures the first index list and the second index list by using other signaling of different names included in the configuration signaling.

Figure 3:
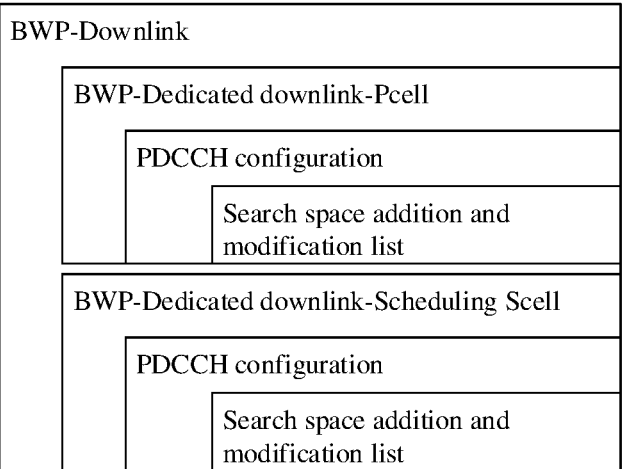
FIG. 3 shows a structural diagram of configuration signaling provided by an exemplary embodiment of the present application.
Figure 4:
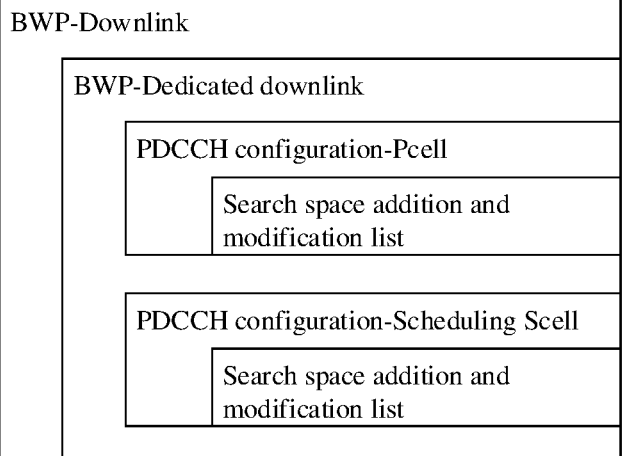
FIG. 4 shows a structural diagram of configuration signaling provided by an exemplary embodiment of the present application.
Figure 5:
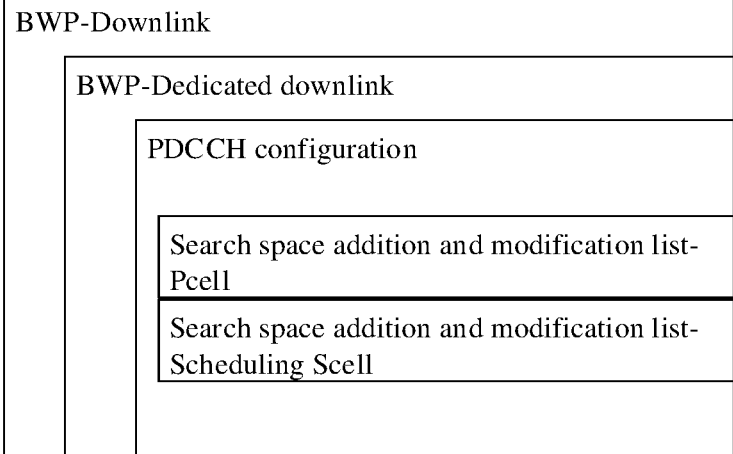
FIG. 5 shows a structural diagram of configuration signaling provided by an exemplary embodiment of the present application.

For example, description is given by taking the first cell being an Scell and the second cell being a Pcell as an example. As shown in FIG. 3, the network device sends bandwidth part-Downlink (BWP-Downlink) signaling to the terminal device, and two bandwidth part-Dedicated downlink (BWP-DownlinkDedicated) signalings included in the BWP-Downlink signaling configure the first search space and the second search space. Alternatively, as shown in FIG. 4, the first search space and the second search space are configured by two Physical Downlink Control Channel Configuration (PDCCH-config) signalings included in the BWP-DownlinkDedicated signaling. Alternatively, as shown in FIG. 5, the first search space and the second search space are configured by two search space addition and modification list (searchSpacesToAddModList) signalings included in the PDCCH-config signaling.

For example, the first search space group includes index identifiers 1, 2, and 3, and the second search space group includes index identifiers 4, 5, and 6. Alternatively, the first search space group includes index identifiers 1, 2, and 3, and the second search space group includes index identifiers 3, 4, and 5.

It should be noted that, in the case that the first search space belongs to the first search space group and the second search space belongs to the second search space group, the configuration signaling may further include state indication information or carrier indication information of the first search space, and may also include state indication information or carrier indication information of the second search space, which is not limited in the embodiment of the present application. In addition, for details about the roles of the state indication information and the carrier indication information, the second case may be referred to.

The second case: the network device configures one search space group for the terminal device.

In some embodiments, the at least one first search space belongs to the first search space group. At the same time, at least one second search space belongs to the first search space group.

The first search space in the first search space group is indicated by an index identifier. The second search space in the first search space group is indicated by an index identifier.

In the embodiment of the present application, the first search space group not only includes a search space for the second cell to perform self-scheduling, but also includes a search space that supports cross-carrier scheduling of the second cell by the first cell.

In some embodiments, the configuration signaling includes a third index list, and the third index list includes the index identifier of the first search space and the index identifier of the second search space.

It should be noted that the network device may configure one first search space group for the terminal device. In this case, the index identifiers in the first search space and the second search space include any of the following situations:

(1) the index identifiers of any two search spaces in at least one first search space and at least one second search space are different;

(2) the index identifiers of at least two search spaces in the at least one first search space and the at least one second search space are the same.

In some embodiments, the configuration signaling includes first state indication information of at least one first search space, or first carrier indication information, and second state indication information of at least one second search space, or second carrier indication information.

The first state indication information is used for indicating that the first search space carries downlink control information used for cross-carrier scheduling of the second cell by the first cell, and the second state indication information is used for indicating that the second search space carries downlink control information used for the second cell to schedule the second cell. The first carrier indication information is used for indicating a carrier where the first search space is located, and the second carrier indication information is used for indicating a carrier where the second search space is located.

In the embodiment of the present application, the first carrier indication information is used for indicating that the carrier where the first search space is located is the first cell, and the second carrier indication information is used for indicating that the carrier where the second search space is located is the second cell.

The first point that needs to be explained is that the embodiments of the present application only take the configuration signaling including the state indication information or the carrier indication information as an example for description. In another embodiment, in the case that the index identifiers of the first search space and the second search space are the same, the configuration signaling includes the state indication information or the carrier indication information, and if the index identifiers of the first search space and the second search space are different, the configuration signaling does not need to include the state indication information or the carrier indication information.

It should be noted that, the above embodiments are only described by taking the network device configuring the search space for the terminal device as an example. In another embodiment, the network device may further configure at least one third search space to be released for the terminal, and the terminal device releases the determined third search space.

In some embodiments, the configuration signaling is also used for releasing at least one third search space. The at least one third search space is used for cross-carrier scheduling the second cell by the first cell, or the at least one third search space is used for the second cell to schedule the second cell.

In the case that the third search space is used for cross-carrier scheduling the second cell by the first cell, the carrier where the third search space is located is the first cell. In the case that the third search space is used for the second cell to schedule the second cell, the carrier where the third search space is located is the second cell.

In some embodiments, the at least one third search space belongs to a first releasing space group.

In some embodiments, the network device configures not only the released at least one third search space for the terminal device, but also configures the released at least one fourth search space for the terminal device.

The configuration information is also used for releasing at least one fourth search space. And, if the third search space is used for cross-carrier scheduling the second cell by the first cell, at least one fourth search space is used for the second cell to schedule the second cell; or, if at least one third search space is used for the second cell to schedule the second cell, at least one fourth search space is used for the first cell to schedule the second cell.

It should be noted that the network device configures the index identifier in the configuration signaling to indicate the search space.

The configuration signaling includes an index identifier of at least one third search space and/or an index identifier of at least one fourth search space. The terminal device determines the indicated third search space and/or fourth search space according to the index identifier in the configuration signaling.

In some embodiments, at least one third search space and at least one fourth search space configured to be released by the network device for the terminal device may belong to the same releasing space group, or may belong to different releasing space groups. Hereinafter, the above cases will be described.

The first case: at least one third search space belongs to the first releasing space group. At least one fourth search space belongs to the first releasing space group.

In some embodiments, the configuration signaling includes a fourth index list. The fourth index list includes an index identifier for indicating the third search space and an index identifier for indicating the fourth search space.

The second case: at least one third search space belongs to the first releasing space group. At least one fourth search space belongs to the second releasing space group.

In some embodiments, the configuration signaling includes a fifth index list and a sixth index list.

The index identifier included in the fifth index list is used for indicating the third search space in the first releasing space group, and the index identifier included in the sixth index list is used for indicating the fourth search space in the second releasing space group.

In some embodiments, the network device configures the third search space and the fourth search space by using other signaling of different names included in the configuration signaling.

In some embodiments, the configuration signaling includes third state indication information of at least one third search space, or third carrier indication information, and fourth state indication information of at least one fourth search space, or fourth carrier indication information.

The third state indication information is used for indicating that the third search space carries the downlink control information used for cross-carrier scheduling the second cell by the first cell, and the fourth state indication information is used for indicating that the fourth search space carries the downlink control information for the second cell to schedule the second cell, the third carrier indication information is used for indicating the carrier where the third search space is located, and the fourth carrier indication information is used for indicating the carrier where the fourth search space is located.

Figure 6:
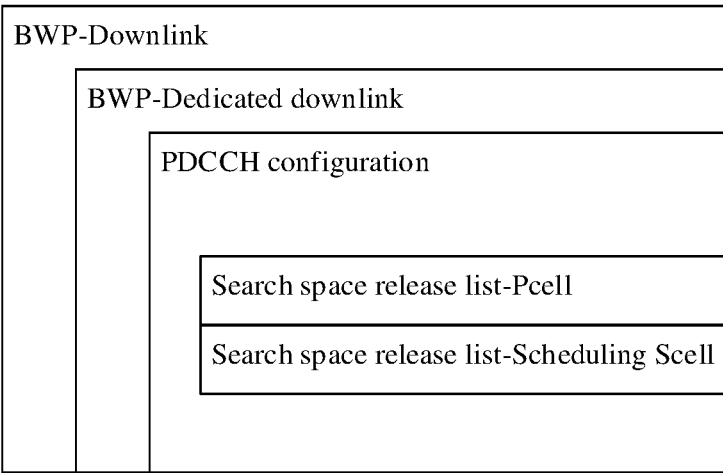
FIG. 6 shows a structural diagram of configuration signaling provided by an exemplary embodiment of the present application.
Figure 7:
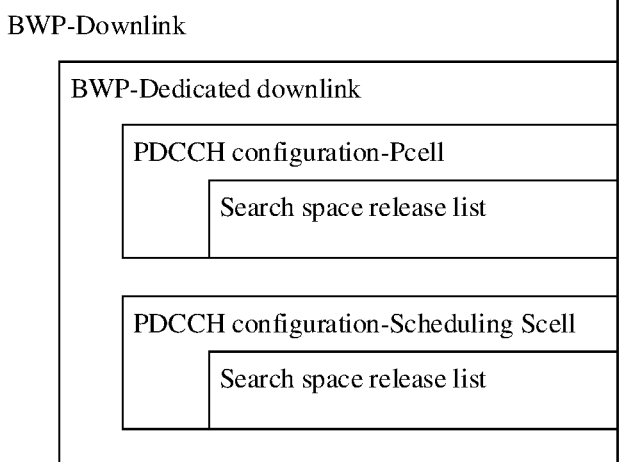
FIG. 7 shows a structural diagram of configuration signaling provided by an exemplary embodiment of the present application.
Figure 8:
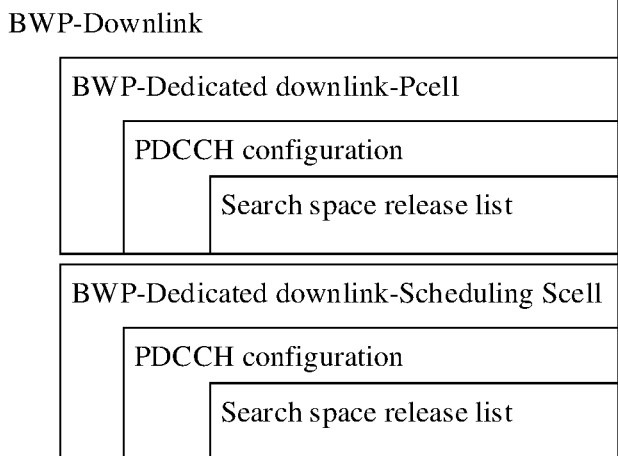
FIG. 8 shows a structural diagram of configuration signaling provided by an exemplary embodiment of the present application.

For example, description is given by taking the first cell being an Scell and the second cell being a Pcell as an example. FIG. 6, FIG. 7, and FIG. 8 show that the network device configures the first search space and the second search space by using signaling with different names. The search space addition and modification list-Scheduling secondary cell (searchSpacesToAddModListSscell) in FIG. 6, Physical downlink control channel configuration-Scheduling secondary cell (PDCCH-configSscell) in FIG. 7, and Bandwidth part-Dedicated downlink scheduling secondary cell (BWP-DownlinkDedicatedSscell) in FIG. 8 are used for configuring the first search space, and Search space addition and modification list-Primary cell (searchSpacesToAddModListPcell) in FIG. 6, Physical downlink control channel configuration-Primary cell (PDCCH-configPcell) in FIG. 7, and Bandwidth part-Dedicated downlink primary cell (BWP-DownlinkDedicatedPcell) in FIG. 8 are used for configuring the second search space.

The network device sends BWP-Downlink signaling to the terminal device, and the first search space and the second search space are configured by two BWP-DownlinkDedicated signalings included in the BWP-Downlink signaling. Alternatively, as shown in FIG. 7, the first search space and the second search space are configured by two PDCCH-config (configuration) signalings included in the BWP-DownlinkDedicated signaling. Alternatively, as shown in FIG. 8, the first search space and the second search space are configured by two search space addition and modification list (searchSpacesToAddModList) signalings included in the PDCCH-config signalings.

Figure 9:
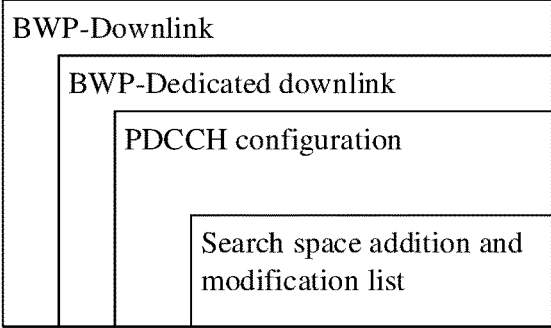
FIG. 9 shows a structural diagram of configuration signaling provided by an exemplary embodiment of the present application.
Figure 10:
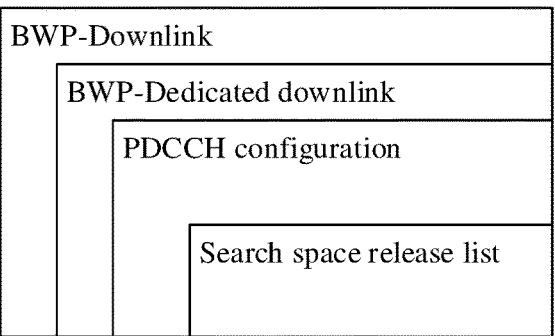
FIG. 10 shows a structural diagram of configuration signaling provided by an exemplary embodiment of the present application.
Figure 11:
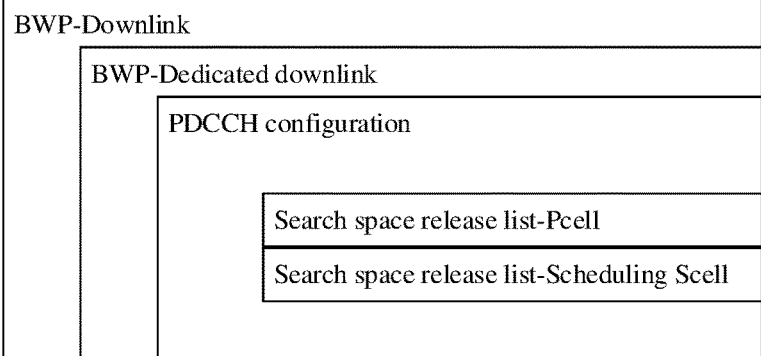
FIG. 11 shows a structural diagram of configuration signaling provided by an exemplary embodiment of the present application.
Figure 12:
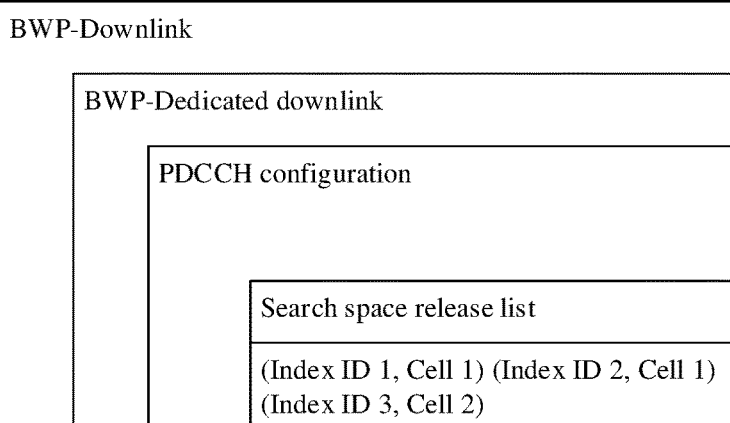
FIG. 12 shows a structural diagram of configuration signaling provided by an exemplary embodiment of the present application.

For another example, description is given by taking the first cell being an Scell and the second cell being a Pcell as an example. In the case that the network device configures one space release group for releasing the search space for the terminal device, as shown in FIG. 9, the network device sends configuration signaling including searchSpacesToAddModList signaling to the terminal device to configure one search space group. Correspondingly, as shown in FIG. 10, the network device sends configuration signaling including Search space release list (searchSpacesToReleaseList) signaling to the terminal device to configure one space release group. Alternatively, correspondingly, as shown in FIG. 11, the network device sends a configuration signaling including Search space release list-Primary cell (searchSpacesToReleaseListPcell) signaling to the terminal device to configure one space release group, and the network device sends a configuration signaling including Search space release list-Scheduling secondary cell (searchSpacesToReleaseListSscell) to the terminal device to configure one space release group. For another example, as shown in FIG. 12, the network device sends configuration information including searchSpacesToReleaseList signaling to the terminal device to configure one search space group, and carrier indication information is also included. Alternatively, as shown in FIG. 13, the network device sends configuration information including searchSpacesToReleaseList signaling to the terminal device to configure one search space group, and state indication information is also included.

It should be noted that, the embodiments of the present application only take the first cell and the second cell as examples for description. In another embodiment, the first cell and the second cell include any of the following cases.

(1) The first cell is Scell, and the second cell is Pcell.

In the case where the first cell is an Scell and the second cell is a Pcell, the network device may configure for the terminal device a search space group that supports the Scell scheduling the Pcell, which expands the way of configuring the search space of the Pcell, and further expands the way that the Pcell is scheduled, thereby improving the communication effect.

(2) The first cell is Scell, and the second cell is Scell.

The Scell of the first cell is different from the Scell of the second cell.

(3) The first cell is Pcell, and the second cell is Scell.

In the case where the first cell is an Scell and the second cell is an Scell, or the first cell is a Pcell and the second cell is an Scell, the network device configures for the terminal device a search space group that supports Scell scheduling Scell, or Pcell scheduling Scell, and the Scell can also self-scheduling, which expands the way of configuring the search space of the Scell, further expands the scheduling method of the Scell, thereby improving the communication effect.

In 230, the terminal device detects downlink control information in at least one first search space.

In the embodiment of the present application, after the terminal device determines at least one first search space, it can determine the resource for the network device to send downlink control information to the terminal device, and the terminal device detects the downlink control information on the determined resource to receive the downlink control information sent by the network device.

The terminal device monitors the PDCCH in at least one first search space to detect the Downlink Control Information (DCI) carried in the PDCCH.

In some embodiments, the configuration signaling sent by the network device is further used for configuring a second search space for the second cell to schedule the second cell, and the terminal device also detects downlink control information in at least one second search space. The network device can configure the terminal device with a first search space that supports cross-carrier scheduling of the second cell by the first cell, and can also configure the terminal device with a second search space that supports second cell to schedule the second cell. The terminal device detects the downlink control information in these search space at the same time, and if the downlink control information is detected in the two search spaces, the second cell is scheduled not only by the second cell but also by the first cell, which extends the way in which the second cell is scheduled.

In the method provided by the embodiment of the present application, the terminal device determines at least one first search space configured by the network device for cross-carrier scheduling of the second cell by the first cell, and the second cell supports self-scheduling, and in the case that the second cell supports self-scheduling, it can also be scheduled by the first cell, which not only expands the way of configuring the search space of the cell, but also expands the way that the cell is scheduled, thereby improving the communication effect.

FIG. 14 shows a block diagram of an apparatus for configuring a search space provided by an exemplary embodiment of the present application. The apparatus is arranged in a terminal device, and the apparatus includes:

a receiving module 1401, configured to receive a configuration signaling sent by a network device, where the configuration signaling is used for configuring at least one first search space used for cross-carrier scheduling of a second cell by a first cell, where the second cell is a self-scheduling cell;

a detection module 1402, configured to detect downlink control information in the at least one first search space.

In some embodiments, the at least one first search space belongs to a first search space group.

In some embodiments, the configuration signaling is further used for configuring at least one second search space, and the at least one second search space is used for the second cell to schedule the second cell.

In some embodiments, the at least one second search space belongs to the first search space group.

In some embodiments, index identifiers of any two search spaces in the at least one first search space and the at least one second search space are different; or, index identifiers of at least two search spaces in the at least one first search space and the at least one second search space are the same.

In some embodiments, the configuration signaling includes first state indication information of the at least one first search space, or first carrier indication information, and second state indication information of the at least one second search space, or second carrier indication information;

the first state indication information is used for indicating that the first search space carries downlink control information used for cross-carrier scheduling the second cell by the first cell, and the second state indication information is used for indicating that the second search space carries downlink control information for the second cell to schedule the second cell;

the first carrier indication information is used for indicating a carrier where the first search space is located, and the second carrier indication information is used for indicating a carrier where the second search space is located.

In some embodiments, the at least one second search space belongs to a second search space group.

In some embodiments, index identifiers of any two search spaces in the first search space group and the second search space group are different; or, index identifiers of at least two search spaces in the first search space group and the second search space group are the same.

In some embodiments, the configuration signaling is further used for releasing at least one third search space, the at least one third search space is used for cross-carrier scheduling the second cell by the first cell, or the at least one third search space is used for the second cell to schedule the second cell.

In some embodiments, the at least one third search space belongs to a first releasing space group.

In some embodiments, the configuration signaling is further used for releasing at least one fourth search space;

if the at least one third search space is used for cross-carrier scheduling the second cell by the first cell, the at least one fourth search space is used for the second cell to schedule the second cell; or, if the at least one third search space is used for the second cell to schedule the second cell, the at least one fourth search space is used for the first cell to schedule the second cell.

In some embodiments, the at least one fourth search space belongs to the first releasing space group.

In some embodiments, the at least one fourth search space belongs to a second releasing space group.

In some embodiments, the configuration signaling includes an index identifier of the at least one third search space and an index identifier of at least one fourth search space.

In some embodiments, the index identifiers of any two search spaces in the at least one third search space and the at least one fourth search space are different; or, index identifiers of at least two search spaces in the at least one third search space and the at least one fourth search space are the same.

In some embodiments, the configuration signaling includes third state indication information of the at least one third search space, or third carrier indication information, and fourth state indication information of the at least one fourth search space, or fourth carrier indication information;

the third state indication information is used for indicating that the third search space carries downlink control information used for cross-carrier scheduling the second cell by the first cell, and the fourth state indication information is used for indicating that the fourth search space carries downlink control information for the second cell to schedule the second cell;

the third carrier indication information is used for indicating a carrier where the third search space is located, and the fourth carrier indication information is used for indicating a carrier where the fourth search space is located.

In some embodiments, the first cell is an Scell, and the second cell is a Pcell; or, the first cell is an Scell, and the second cell is an Scell; or, the first cell is a Pcell, and the second cell is an Scell.

FIG. 15 shows a block diagram of an apparatus for configuring a search space provided by an exemplary embodiment of the present application. The apparatus is arranged in a network device, and the apparatus includes:

a sending module 1501, configured to send a configuration signaling to a terminal device, where the configuration signaling is used for configuring at least one first search space for cross-carrier scheduling a second cell by a first cell, where the second cell is a self-scheduling cell;

where the terminal device is configured to detect downlink control information in the at least one first search space.

In some embodiments, the at least one first search space belongs to a first search space group.

In some embodiments, the configuration signaling is further used for configuring at least one second search space, and the at least one second search space is used for the second cell to schedule the second cell.

In some embodiments, the at least one second search space belongs to the first search space group.

In some embodiments, index identifiers of any two search spaces in the at least one first search space and the at least one second search space are different; or, index identifiers of at least two search spaces in the at least one first search space and the at least one second search space are the same.

In some embodiments, the configuration signaling includes first state indication information of the at least one first search space, or first carrier indication information, and second state indication information of the at least one second search space, or second carrier indication information;

the first state indication information is used for indicating that the first search space carries downlink control information used for cross-carrier scheduling the second cell by the first cell, and the second state indication information is used for indicating that the second search space carries downlink control information for the second cell to schedule the second cell;

the first carrier indication information is used for indicating a carrier where the first search space is located, and the second carrier indication information is used for indicating a carrier where the second search space is located.

In some embodiments, the at least one second search space belongs to a second search space group.

In some embodiments, index identifiers of any two search spaces in the first search space group and the second search space group are different; or, the index identifiers of at least two search spaces in the first search space group and the second search space group are the same.

In some embodiments, the configuration signaling is further used for releasing at least one third search space, the at least one third search space is used for cross-carrier scheduling the second cell by the first cell, or the at least one third search space is used for the second cell to schedule the second cell.

In some embodiments, the at least one third search space belongs to a first releasing space group.

In some embodiments, the configuration signaling is further used for releasing at least one fourth search space;

if the at least one third search space is used for cross-carrier scheduling the second cell by the first cell, the at least one fourth search space is used for the second cell to schedule the second cell; or, if the at least one third search space is used for the second cell to schedule the second cell, the at least one fourth search space is used for the first cell to schedule the second cell.

In some embodiments, the at least one fourth search space belongs to the first releasing space group.

In some embodiments, the at least one fourth search space belongs to a second releasing space group.

In some embodiments, the configuration signaling includes an index identifier of the at least one third search space and an index identifier of at least one fourth search space.

In some embodiments, the index identifiers of any two search spaces in the at least one third search space and the at least one fourth search space are different; or, index identifiers of at least two search spaces in the at least one third search space and the at least one fourth search space are the same.

In some embodiments, the configuration signaling includes third state indication information of the at least one third search space, or third carrier indication information, and fourth state indication information of the at least one fourth search space, or fourth carrier indication information;

the third state indication information is used for indicating that the third search space carries downlink control information used for cross-carrier scheduling the second cell by the first cell, and the fourth state indication information is used for indicating that the fourth search space carries downlink control information for the second cell to schedule the second cell;

the third carrier indication information is used for indicating a carrier where the third search space is located, and the fourth carrier indication information is used for indicating a carrier where the fourth search space is located.

In some embodiments, the first cell is an Scell, and the second cell is a Pcell; or, the first cell is an Scell, and the second cell is an Scell; or, the first cell is a Pcell, and the second cell is an Scell.

FIG. 16 shows a schematic structural diagram of a communication device provided by an exemplary embodiment of the present application. The communication device includes: a processor 1601, a receiver 1602, a transmitter 1603, a memory 1604 and a bus 1605.

The processor 1601 includes one or more processing cores, and the processor 1601 executes various functional applications and information processing by running software programs and modules.

The receiver 1602 and the transmitter 1603 may be implemented as one communication component, which may be a communication chip.

The memory 1604 is connected to the processor 1601 through the bus 1605.

The memory 1604 may be configured to store at least one program code, and the processor 1601 is configured to execute the at least one program code, so as to implement various steps in the above method embodiments.

Furthermore, the communication device may be a terminal device or a network device. The memory 1604 may be implemented by any type or combination of volatile or non-volatile storage devices including, but not limited to: a magnetic or optical disk, an electrically erasable programmable read-only Memory (EEPROM), an Erasable Programmable Read Only Memory (EPROM), a Static Radom Access Memory (SRAM), a Read Only Memory (ROM), a magnetic memory, a flash memory, a Programmable Read Only Memory (PROM).

In an exemplary embodiment, a computer-readable storage medium is also provided, and executable program codes are stored in the readable storage medium, and the executable program codes are loaded and executed by a processor to implement the method for configuring a search space performed by the communication device provided by the above-mentioned various method embodiments.

In an exemplary embodiment, a chip is provided, the chip includes a programmable logic circuit and/or program instructions, when the chip runs on a terminal device or a network device, the method for configuring a search space provided in the various method embodiments is implemented.

In an exemplary embodiment, a computer program product is provided, and when the computer program product is executed by a processor of a terminal device or a network device, the computer program product is used to implement the method for configuring a search space provided by each of the above method embodiments.

Those of ordinary skill in the art can understand that all or part of the steps of implementing the above embodiments can be completed by hardware, or can be completed by instructing relevant hardware through a program, and the program can be stored in a computer-readable storage medium. The storage medium mentioned above may be a read-only memory, a magnetic disk or an optical disk, etc.

The above descriptions are only optional embodiments of the present application, and are not intended to limit the present application. Any modifications, equivalent replacements, improvements, etc. made within the spirit and principles of the present application shall be included in the protection scope of the present application.

What is claimed is:

1. A method for configuring a search space, applied to a terminal device, wherein the method comprises:

receiving a configuration signaling sent by a network device, wherein the configuration signaling is used for configuring at least one first search space for cross-carrier scheduling a second cell by a first cell, and the second cell is a self-scheduling cell; and detecting downlink control information in the at least one first search space;

wherein the configuration signaling is further used for releasing at least one third search space, and the at least one third search space is used for cross-carrier scheduling the second cell by the first cell, or the at least one third search space is used for the second cell to schedule the second cell, wherein the at least one third search space belongs to a first releasing space group;

wherein the configuration signaling is further used for releasing at least one fourth search space;

in response to that the at least one third search space is used for cross-carrier scheduling the second cell by the first cell, the at least one fourth search space is used for the second cell to schedule the second cell; or, in response to that the at least one third search space is used for the second cell to schedule the second cell, the at least one fourth search space is used for the first cell to schedule the second cell, wherein the at least one fourth search space belongs to the first releasing space group.

2. The method according to claim 1, wherein the at least one first search space belongs to a first search space group.

3. The method according to claim 2, wherein the configuration signaling is further used for configuring at least one second search space, and the at least one second search space is used for the second cell to schedule the second cell.

4. The method according to claim 3, wherein the at least one second search space belongs to the first search space group.

5. The method according to claim 4, wherein index identifiers of any two search spaces in the at least one first search space and the at least one second search space are different; or, index identifiers of at least two search spaces in the at least one first search space and the at least one second search space are the same.

6. The method according to claim 5, wherein the configuration signaling comprises first state indication information of the at least one first search space, or first carrier indication information, and second state indication information of the at least one second search space, or second carrier indication information;

wherein the first state indication information is used for indicating that the first search space carries downlink control information used for cross-carrier scheduling the second cell by the first cell, and the second state indication information is used for indicating that the second search space carries downlink control information for the second cell to schedule the second cell;

wherein the first carrier indication information is used for indicating a carrier where the first search space is located, and the second carrier indication information is used for indicating a carrier where the second search space is located.

7. The method according to claim 1, wherein the configuration signaling comprises an index identifier of the at least one third search space and an index identifier of at least one fourth search space, wherein index identifiers of any two search spaces in the at least one third search space and the at least one fourth search space are different; or, index identifiers of at least two search spaces in the at least one third search space and the at least one fourth search space are the same.

8. The method according to claim 1, wherein the first cell is an Scell, and the second cell is a Pcell; or, the first cell is an Scell, and the second cell is an Scell; or, the first cell is a Pcell, and the second cell is an Scell.

9. An apparatus for configuring a search space, arranged in a network device, wherein the apparatus comprises:

a processor;

a transceiver connected to the processor; and a memory for storing an executable program code for the processor;

wherein the processor is configured to load and execute the executable program code to:

send a configuration signaling to a terminal device, wherein the configuration signaling is used for configuring at least one first search space for cross-carrier scheduling a second cell by a first cell, and the second cell is a self-scheduling cell;

wherein the terminal device is configured to detect downlink control information in the at least one first search space;

the configuration signaling is further used for releasing at least one third search space, and the at least one third search space is used for cross-carrier scheduling the second cell by the first cell, or the at least one third search space is used for the second cell to schedule the second cell, wherein the at least one third search space belongs to a first releasing space group;

wherein the configuration signaling is further used for releasing at least one fourth search space;

in response to that the at least one third search space is used for cross-carrier scheduling the second cell by the first cell, the at least one fourth search space is used for the second cell to schedule the second cell; or, in response to that the at least one third search space is used for the second cell to schedule the second cell, the at least one fourth search space is used for the first cell to schedule the second cell, wherein the at least one fourth search space belongs to the first releasing space group.

10. The apparatus according to claim 9, wherein the at least one first search space belongs to a first search space group.

11. The apparatus according to claim 10, wherein the configuration signaling is further used for configuring at least one second search space, and the at least one second search space is used for the second cell to schedule the second cell.

12. The apparatus according to claim 11, wherein the at least one second search space belongs to the first search space group.

13. The apparatus according to claim 12, wherein index identifiers of any two search spaces in the at least one first search space and the at least one second search space are different; or, index identifiers of at least two search spaces in the at least one first search space and the at least one second search space are the same.

14. The apparatus according to claim 13, wherein the configuration signaling comprises first state indication information of the at least one first search space, or first carrier indication information, and second state indication information of the at least one second search space, or second carrier indication information;

wherein the first state indication information is used for indicating that the first search space carries downlink control information used for cross-carrier scheduling the second cell by the first cell, and the second state indication information is used for indicating that the second search space carries downlink control information used for the second cell to schedule the second cell;

wherein the first carrier indication information is used for indicating a carrier where the first search space is located, and the second carrier indication information is used for indicating a carrier where the second search space is located.

15. The apparatus according to claim 9, wherein the configuration signaling comprises an index identifier of the at least one third search space and an index identifier of at least one fourth search space, wherein index identifiers of any two search spaces in the at least one third search space and the at least one fourth search space are different; or, index identifiers of at least two search spaces in the at least one third search space and the at least one fourth search space are the same.

16. The apparatus according to claim 9, wherein the first cell is an Scell, and the second cell is a Pcell; or, the first cell is an Scell, and the second cell is an Scell; or, the first cell is a Pcell, and the second cell is an Scell.

* * * * *